United States Patent [19]

Olson

[11] 4,251,044
[45] Feb. 17, 1981

[54] OXYGEN WALKER

[76] Inventor: Kathy L. Olson, P.O. Box 231 C, Britt, Minn. 55710

[21] Appl. No.: 71,743

[22] Filed: Aug. 30, 1979

[51] Int. Cl.³ .............................................. F16M 11/38
[52] U.S. Cl. ..................................... 248/166; 108/115; 135/67
[58] Field of Search ...................... 248/165, 166, 188.6; 135/67; 108/134, 115; 211/132, 149, 201; 403/245

[56] References Cited

U.S. PATENT DOCUMENTS

| 924,386 | 6/1909 | Shek | 211/201 |
|---|---|---|---|
| 2,284,624 | 6/1942 | Schwinn | 403/245 |
| 2,957,736 | 10/1960 | Olander et al. | 108/119 X |
| 3,709,556 | 1/1973 | Allard | 248/125 X |
| 3,993,088 | 11/1976 | Thomas | 248/166 X |
| 4,045,044 | 8/1977 | Bierer | 297/DIG. 4 |
| 4,074,683 | 2/1978 | Chiara | 135/67 |

FOREIGN PATENT DOCUMENTS

| 102929 | 1/1924 | Switzerland | 248/166 |
|---|---|---|---|
| 586911 | 1/1970 | U.S.S.R. | 135/67 |

OTHER PUBLICATIONS

"Aluminum Walkers", Winchester Walker Co., p. 1, 11-8-54.

Primary Examiner—J. Franklin Foss
Attorney, Agent, or Firm—Peterson, Palmatier, Sturm & Sjoquist, Ltd.

[57] ABSTRACT

A pair of side frames, formed of inverted U-shaped metal tubes and having horizontal brace members, are spaced apart and rigidly connected by crossed tubular members which pivotably engage the metal tubes of the side frame at their ends, one pair of tubular ends being detachable. An armrest pad is hingedly connected across the top of the side frames, such that the pad can be folded down and the side frames collapsed inwardly, after detachment of the crossed tubular members. One of the horizontal brace members supports a cylindrical holder for an oxygen bottle.

5 Claims, 5 Drawing Figures

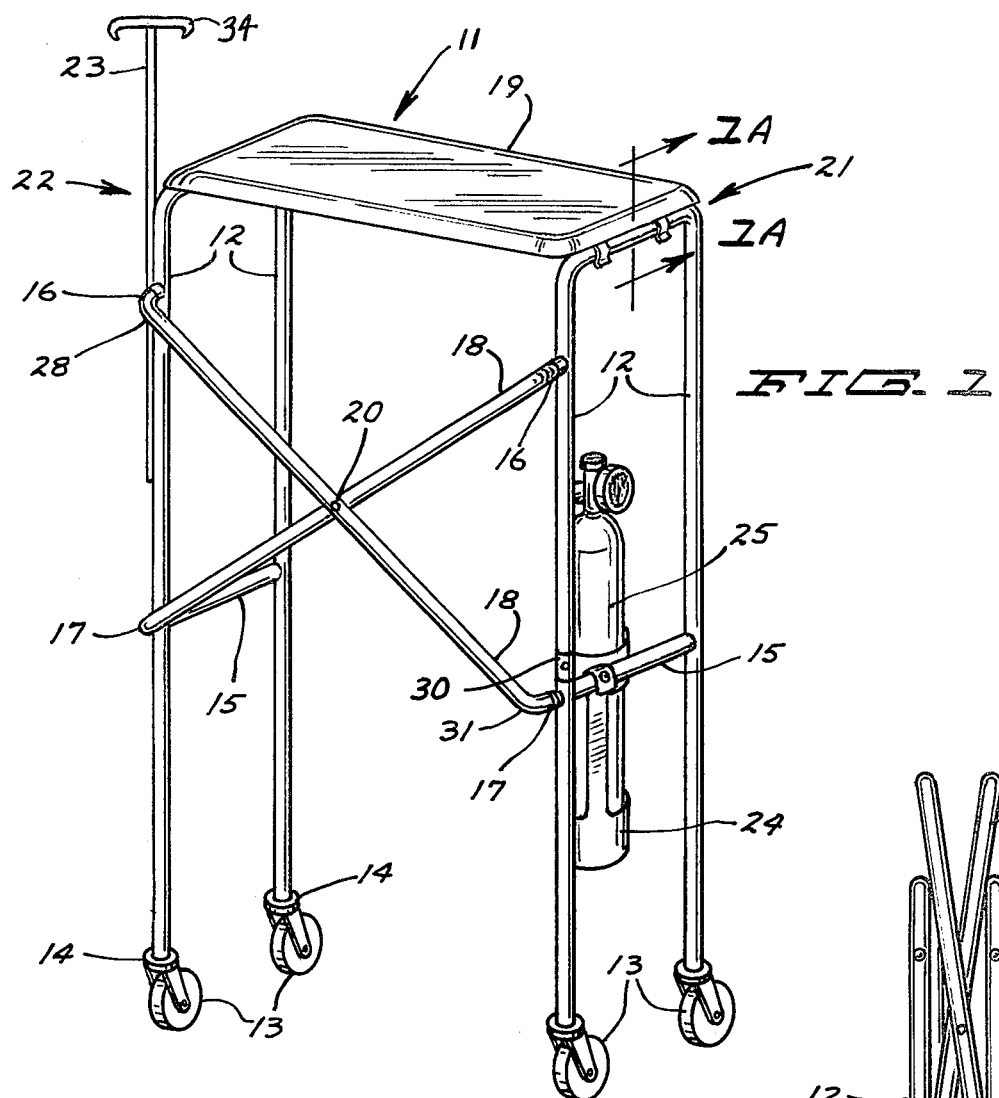
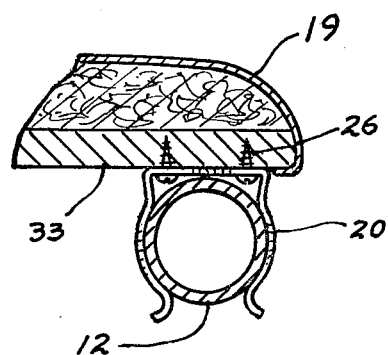
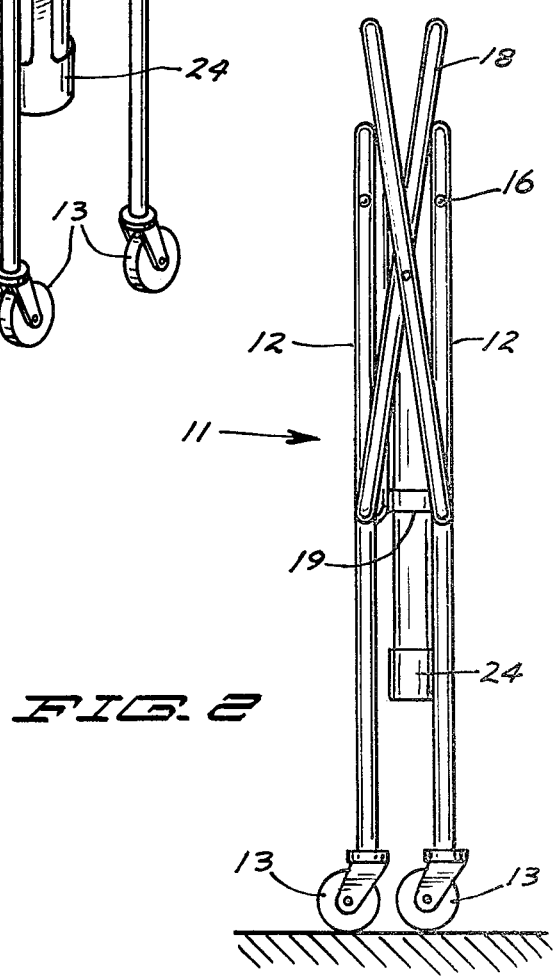

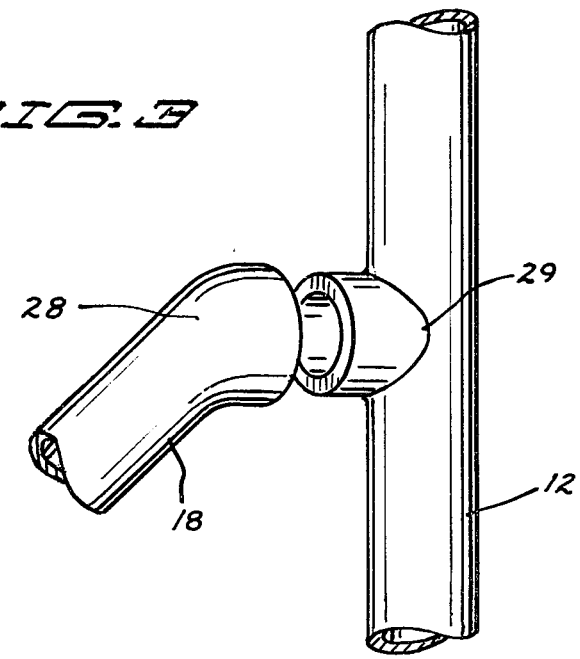
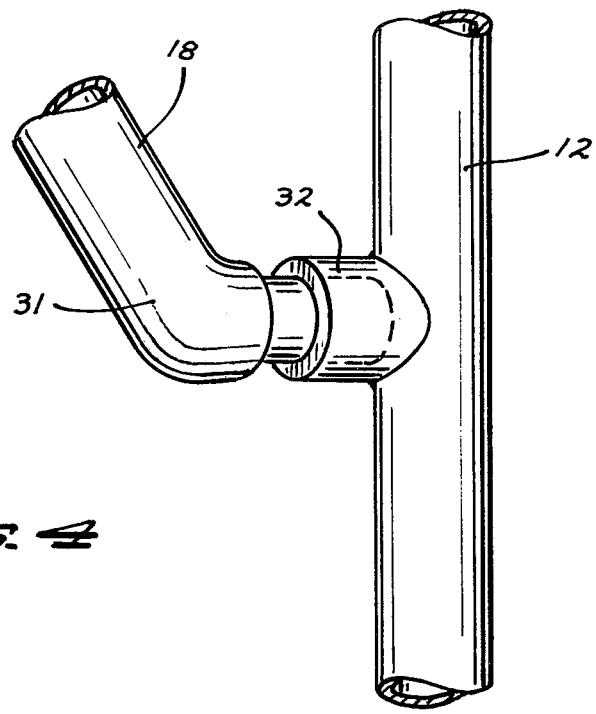

OXYGEN WALKER

BACKGROUND OF THE INVENTION

This invention relates to self-supporting walking devices for respiratory and/or cardiac invalids or other such patients, and, more particularly, to a collapsible oxygen walker.

Typical oxygen walkers have rectangular frames with wheels on the bottom and are open at one side to allow a patient to stand within or partially within the walker. Using the horizontal support pad of the walker as an armrest, the patient can support himself while he moves about. In hospitals it is also often required that oxygen bottles and intravenous equipment be used by the respiratory and cardiac patient during the ambulatory phase of rehabilitation.

Numerous devices have been developed to allow various types of transport by the patient alone. A variety of devices are concerned with combinations of walkers and chairs, such as those disclosed in U.S. Pat. Nos. 2,733,754, 2,759,525, 2,866,495, and 4,046,374. Others deal with adjustable legs for walkers, as in U.S. Pat. No. 3,387,617. All walkers and patient transporters indicate the need for rigidity and solid support. Further walkers are disclosed in U.S. Pat. Nos. 3,517,666, 3,354,893, 3,698,810 and 4,045,044.

Although presently available walkers have demonstrated their usefulness, problems remain. Much of the difficulty arises from their inability to provide oxygen capabilities and/or I.V. therapy to the ambulatory patient during rehabilitation.

SUMMARY OF THE INVENTION

In accordance with this invention there is provided a walker comprising a pair of side frames formed of inverted U-shaped metal tubes having horizontal side braces, for supporting a cylindrical carrier for an oxygen bottle, and being connected by crossed metal members which pivotably engage connector means disposed on the side frames, the crossed metal members being detachable at an aligned pair of ends such that the side frames can be collapsed inwardly from a rigid in-place position. An armrest pad is hinged across the top of the side frames before they are pushed together. Wheel means, such as casters, are disposed at the four bottom ends of the side frames, to allow rolling movement of the walker. Preferably, the connector means on the side frames comprise a pair of tubular projections disposed adjacent the horizontal braces for pivotably receiving the lower ends of the crossed metal members. A pair of pins are disposed above the tubular projections for detachably receiving the other ends of the crossed metal members.

It is a primary object of this invention to provide an oxygen walker which may also accommodate the retractable stand necessary for I.V. therapy.

It is another object of this invention to provide an oxygen walker that exhibits excellent rigidity and support characteristics during use but that may also be readily collapsed for transport and storage in cramped quarters, such as hospital rooms and closets.

It is a further object of this invention to provide a lightweight and inexpensively fabricated walker having a minimum of structural components.

BRIEF DESCRIPTION OF THE DRAWINGS

FIG. 1 is a pictorial view of the walker of this invention.

FIG. 1A is an enlarged sectional view taken along line 1A—1A of FIG. 1.

FIG. 2 is a view of the walker of FIG. 1 in collapsed position.

FIG. 3 is an enlarged fragmentary view showing the upper connection of one of the crossed metal members; and FIG. 4 is an enlarged fragmentary view showing the lower connections of one of the crossed metal members.

DESCRIPTION OF PREFERRED EMBODIMENT

Referring to FIG. 1, oxygen walker 11 has a pair of side frames defined by inverted U-shaped metal tubes 12, preferably formed of chrome-plated tubular aluminum. Wheels 13 are disposed by brackets 14 at the four bottom ends of the side frames to allow movable support of the walker. Horizontal brace members 15, also of tubular metal, are disposed on the side frames about three quarters of the way down from the top. The side frames have connector means 16, 17 for pivotal connection with crossed metal members 18, the connector means being shown in detail by FIGS. 3, 4. The crossed members 18 are pivotally secured together at point 20.

An armrest pad 19, formed of sponge rubber or the like and a plastic or leather covering, is hingedly connected at end 21, and detachably connected at the other end 22 to the top of the side frames. A telescoping I.V. standard 23, having cross member 34, is attached to one of the metal tubes 12 making up a side frame, and a cylindrical support bracket 24, having clamp 30, is attached to the horizontal brace member 15 and one of the metal tubes 12 for carrying of an oxygen cylinder 25.

As shown in FIG. 1A, a pair of metal snaps 20 firmly hold armrest pad 19 in place atop the walker, supported by tube 12. Snaps 20 are attached by screws 26 to frame member 33 of pad 19. When the walker is to be folded up, the end 21 of pad 19 is pulled upwardly to disengage the pad from tube 12, and the pad is then pivoted downwardly about its hinged end, to the closed position shown in FIG. 2.

As shown in FIG. 2, oxygen walker 11 can be collapsed inwardly by detaching the upper pair of ends of crossed members 18 from the connector means 16 and pushing the side frames together, after detaching end 22 of armrest pad 19 by first pulling upward to release snaps 20 and folding pad 19 down between the side frames. I.V. standard 23 is telescoped downwardly, oxygen cylinder 25, as shown in FIG. 1, has been removed from support bracket 24. The oxygen walker can then be easily lifted into a car or rolled into a closet for storage.

The upper attachment of the crossed members 18 is shown in FIG. 3. Ends 28 of members 18 are adapted to fit over cylindrical members 29 projecting from tubes 12. As shown in FIG. 4, the bottom ends 31 fit into sockets 32 projecting from metal tubes 12, the sockets being in line with horizontal brace members 15. This in-line feature of the sockets and horizontal brace members, together with the crisscrossing of metal members 18 has been found to provide a lightweight and easily maneuvered oxygen walker having excellent stability and support characteristics.

I claim:

1. An oxygen walker comprising:

a pair of side frames disposed apart and formed of inverted U-shaped metal tubes having horizontal brace members adapted for supporting a source of oxygen, each of the side frames having a pair of vertically spaced apart connector means on the same side, with the connector means of one side frame being horizontally aligned with the connector means of the other side frame, said connector means comprising lower tubular projections in substantial alignment with the horizontal brace members and upper cylindrical projections;

a pair of U-shaped tubular members, pivotably secured for relative rotational movement about their center portions and including one end adapted to be pivotably received in the tubular connectors on said side frames and adapted to be removably disposed over the cylindrical connectors on said side frames, whereby disengagement of the corresponding ends of said members from said cylindrical connectors, allows for folding of said side frames toward one another and unfolding and engagement of the corresponding ends of said members with said cylindrical projections provides a rigid structure.

2. The subject matter of claim 1 in which an open generally cylindrical oxygen container receiving means is disposed with its upper open end attached to the horizontal brace member and a vertical portion of the U-shaped metal tube of one of the side frames.

3. The subject matter of claim 1 in which an arm rest pad is pivotably disposed on the upper section of one of the U-shaped frame members and detachably engageable with the corresponding portion of the other of the U-shaped frame members.

4. The subject matter of claim 1, 2 or 3 and wheeled support means disposed on each of the lower ends of the side frames.

5. The subject matter of claims 1, 2, 3 or 4 and a telescoping intravenous container receiving standard vertically disposed on a vertical portion of one of the side frames.

* * * * *